March 10, 1964 A. LORO 3,124,638
APPARATUS FOR THE ORIENTATION OF CRYSTALS
Filed July 25, 1960 2 Sheets-Sheet 1

Inventor
A. LORO
By Robert B. Harmon
Attorney

Inventor
A. LORO
By Robert B. Harmon
Attorney

United States Patent Office 3,124,638
Patented Mar. 10, 1964

3,124,638
APPARATUS FOR THE ORIENTATION
OF CRYSTALS
Alberto Loro, Ville Lemoyne, Quebec, Canada, assignor to Northern Electric Company Limited, Montreal, Quebec, Canada, a corporation of Canada
Filed July 25, 1960, Ser. No. 45,075
4 Claims. (Cl. 88—14)

This invention relates to the orientation of crystals and more particularly to an apparatus for the optical orientation of single crystal materials.

Because many important properties of mono-crystalline base material show directional behaviour, exact knowledge of crystal orientation is critical in the production of some kinds of semiconductor devices. X-ray techniques, reflection goniometry and microscopic examination of etch pits are well known to the art for achieving crystal orientation. One method well known to the art is described in the January 1958 issue of the Sylvania Technologist. In this method the crystal surface is first ground and then etched. A large number of etch pits of microscopic size are thus created at the surface of the crystal. These pits are bounded by minute facets which are more or less perfect planes. A convergent beam of light is caused to fall upon and be reflected from the facets of the etch pits. Such a beam of light is split into two or more components, the number being equal to the number of bounding planes comprising one single etch pit. The planes behave like tiny mirrors whose orientation with respect to the incident beam is the same for all etch pits. The reflected beam is intercepted by a screen forming a light pattern or reflectogram. This pattern shows the symmetry of the crystal in the direction of the incident light beam. A reference mark for the center of symmetry of the reflectogram is located by placing a plane mirror on a goniometer with horizontal and vertical settings of the latter at zero. The mirror is then replaced by a crystal and the goniometer settings are adjusted so that the center of the reflectogram is at the marked point on the screen. The horizontal and vertical scale readings on the goniometer then give the tilt of the crystallographic plane with respect to the crystal mount.

The principal object of this invention is to provide a more simple apparatus for crystal orientation using the same basic principles as the arrangement described above but whereby an expensive goniometer is not required and where the calibration step for determining the center of symmetry of the reflectogram is eliminated, thereby permitting a direct reading of the misorientation.

Other objects of this invention are to provide an inexpensive orientation device, of simple rugged construction with no adjustment required and which cannot go out of calibration.

These and other objects of this invention are attained in one embodiment of the invention by concentrating light from a light source through a small circular aperture located in the center of a graticule onto a partial reflecting mirror at approximately 45 degrees and thence by reflection onto a second partial reflecting mirror behind which is mounted a suitably etched single crystal material having its etched surface in contact with and parallel to the rear surface of the mirror. By means of double reflection in the mirrors, an operator can view simultaneously a virtual image of the graticule having a bright center spot representing the mirror reflection and a further virtual image or reflectrogram produced by the planes bounding the etch pits in the crystal surface representing the symmetry of the crystal in the direction of the incident light beam. With the graticule consisting of a rectangular pattern of clear lines on a black background, the lines being spaced to be read in degrees about a horizontal and vertical axis, the misorientation of the crystal can be measured directly in degrees.

Other objects and advantages of this invention will become apparent in the following detailed description when read in view of the accompanying drawings where like numbers refer to like parts and in which.

This invention is particularly applicable to the orientation of semiconductor materials such as silicon and germanium but may be used for the orientation of any crystalline material in which etch pits can be produced and which give an easily recognizable reflectrogram.

Figure 1:
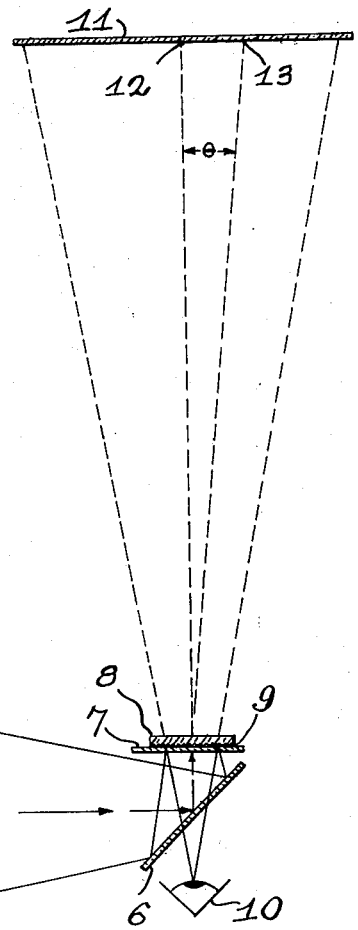
FIG. 1 shows the technique of orientation involved in one embodiment of this invention.

Referring to FIG. 1, there is shown a light source 1 the light from which is concentrated through a small circular aperture 2 in a graticule 3 by means of condensing lens 4 and a suitable reflector 5 such that the remainder of a graticule 3 with respect to the aperture 2 is illuminated at a much lower level. This effect can be easily obtained by applying a plain white surface to the interior of the lamp house. The diameter of the aperture 2 may be approximately one millimeter. The light passing through the graticule is reflected from a partial reflecting plane mirror 6 at approximately 45 degrees onto partial reflecting plane mirror 7 which is arranged to mount crystal 8 having its etched surface 9 in contact with and parallel to the rear surface of mirror 7. The light source 1 and the lens 4 are adjusted so the lens 4 will focus a beam of light that when reflected by mirror 6 will cover the complete etched surface 9 of the crystal 8. Thin clear plate glass is satisfactory material for mirrors 6 and 7.

An operator represented by an eye 10 views a virtual image 11 of the graticule 3 having a bright center spot 12 by double reflection in the two reflecting mirrors 6 and 7 which represents the center of symmetry of reflectrograms. The operator 10 also sees a virtual image or reflectogram produced by the planes bounding the etch pits in the surface 9 of crystal 8, having a bright center spot 13 displaced from the center spot 12 by an angle $\theta$. The angle $\theta$ represents twice the angle of misorientation of the crystal 8. The whole apparatus should be enclosed in any convenient light tight enclosure.

Figure 2:
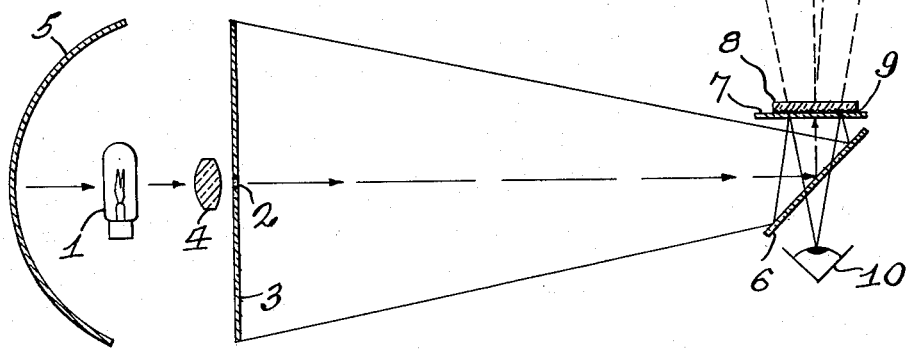
FIG. 2 is a front view of the graticule and reflectrograms as seen by an operator.
Figure 2:
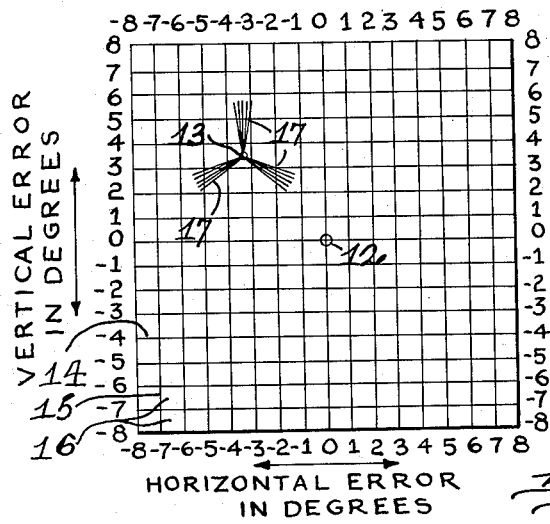

Referring to FIG. 2, there is shown a front view of the graticule 3 as seen by the operator 10 in the image 11. The graticule consists of a rectangular pattern of clear horizontal and vertical lines 14 and 15 respectively on a black background 16. The spacing of the lines 14 and 15 is arranged to measure the crystal misorientation represented by the angle $\theta$ directly in degrees about a horizontal and vertical axis corresponding to the rotational and tilt axes of a cutting machine used to prepare the crystal sample. The bright center spot 12 represents the center of symmetry of reflectrograms and bright center spot 13 and a typical reflected pattern 17 represent a misoriented (111) silicon crystal surface. The error shown in this case would be approximately −3°20′ horizontal and +3°30′ vertical. If this misoriented slice were taken from a saw table, the readings would indicate that rotating the table horizontally 3°20′ and vertically 3°30′, would set the saw to cut an accurately oriented slice.

Figure 3:
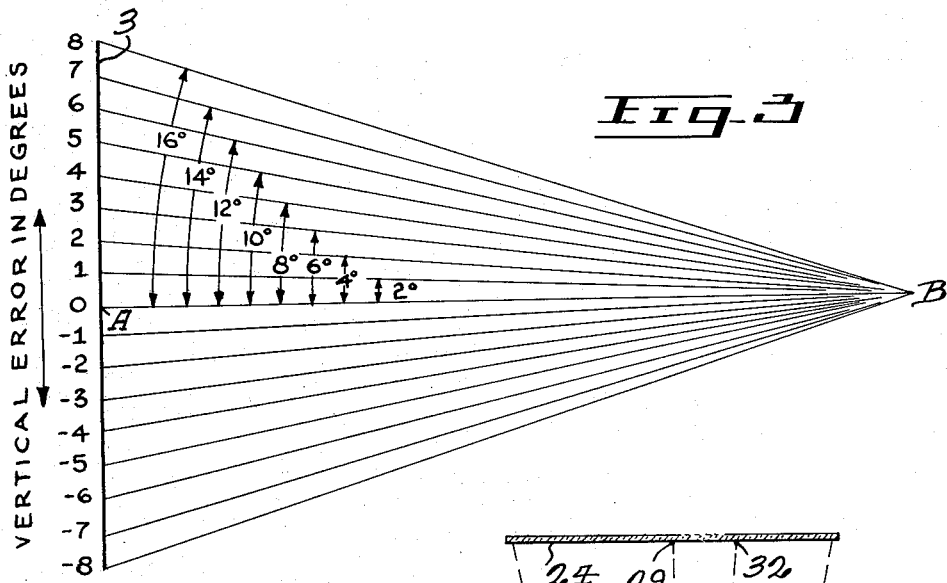
FIG. 3 shows a side elevation view of the graticule and depicts the angular relationship to the optical distances in the apparatus.

Referring to FIG. 3 there is shown a side elevation view of the graticule 3 showing the angular relationships to the optical distances in the apparatus. Before constructing the horizontal and vertical lines 14 and 15 of FIG. 2 on the graticule it is necessary to know the desired optical distance from the center of the graticule to the center of the crystal surface, that is, in FIG. 1 the distance from the center of the graticule 3 to the mirror 6 and thence by reflection to the surface 9 of the crystal 8. This distance is represented by line AB in FIG. 3. Having determined the distance AB the horizontal and vertical scales can be readily determined, as any line corresponding to $x$ degrees on the graticule subtends $2x$ degrees at an optical distance AB. This can be seen in FIG. 3 where the various two degree lines extending from point B to the vertical surface of the graticule produce the one degree separations on the graticule. It should be noted that sub-divisions on the graticule become progressively large with increasing distance from the center of the graticule.

In the embodiment of FIG. 1 the distance AB can be approximately 15 inches which is also approximately the apparent distance of the graticule from the operator's eye. A scale of ½ inch on the graticule subtends approximately 1 degree at a distance AB of 15 inches. With the 1 degree divisions on the graticule approximately ½ inch apart, an operator can easily estimate to ±1/10 inch on the scale at a distance of 15 inches which will read to an accuracy of ±12 minutes of arc. It also should be noted that since the graticule is seen by double reflection, it is not reversed or inverted and therefore writing on it is done in the normal manner.

Figure 4:
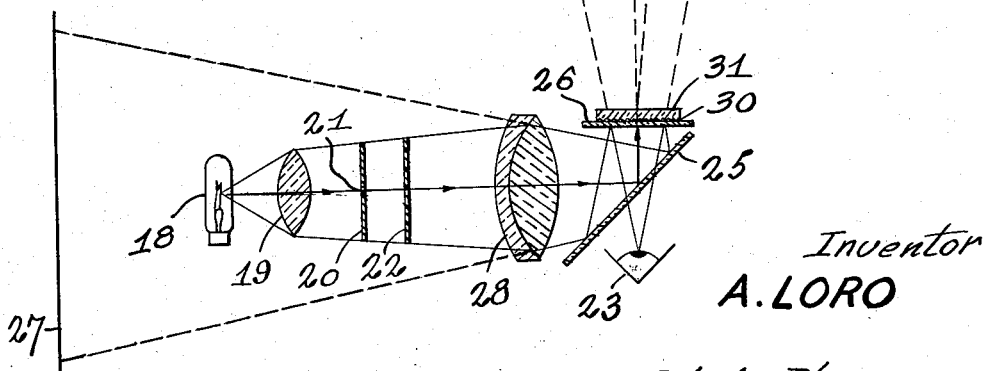
FIG. 4 shows another embodiment of the invention.

Referring to FIG. 4, there is shown another embodiment of this invention whereby the apparatus can be made very small and compact. Light source 18 is concentrated by means of condenser lens 19 through a neutral density filter 20, which can be a piece of partially exposed and developed photographic film, having a small circular aperture 21 therein, onto a small graticule 22 which conveniently can be less than ½ square inch in area, such that the remainder of the graticule 22 with respect to the area in the optical path of the aperture 21 in the filter 20 is illuminated at a much lower level. An operator represented by an eye 23 will view a large virtual image 24 of the small graticule 22 by means of double reflection in mirrors 25 and 26 of a large virtual image 27 of the graticule 22 produced by refraction in lens 28 which preferably is a convex achromatic lens. Similar to the embodiment of FIG. 1, the operator can simultaneously view the large virtual image 24 of the small graticule 22 having a bright center spot 29 and a virtual image or reflectrogram produced by the planes bounding the etch pits in the surface 30 of crystal 31 having a bright center spot 32 displaced from the center spot 29 by an angle $\theta$.

As can be readily understood by the above description the invention consists essentially of the measurement of the direction of light reflected from the etched crystal surface relative to that reflected from a plane mirror parallel with the crystal surface. With the two reflections viewed simultaneously there is no possibility of error due to the misplacement of a mirror or a crystal during change from one to the other and the calibrating step of determining the position of the mirror image is entirely eliminated. The apparatus can be used in normal room lighting without the use of a special high intensity light source or of costly high aperture lenses.

Results obtained with this apparatus on a 111 plane of silicon have been checked by the X-ray method and have shown that it is easy to read better than 10 minutes of arc and that an accuracy of 5 minutes can be achieved with care. Because the reflectrograms obtained from the 110 and 100 planes of silicon and from all planes of germanium are not so well defined, a somewhat lower accuracy of approximately 30 minutes can be achieved.

What is claimed is:

1. An apparatus for determining the orientation of a single crystal having an etched surface where the approximate crystallographic plane of the crystal is known, comprising:
   (a) a graticule having its lines forming a scale symmetrical about a central spot of the graticule;
   (b) means for illuminating the graticule with its central spot being illuminated to a greater intensity than the remainder of the scale;
   (c) a first partial reflecting plane mirror spaced a predetermined distance from the graticule, a second partial reflecting plane mirror located with respect to the graticule and to the first said mirror to direct the light emanating from the graticule to be incident on one side of the first said mirror, the reflection therefrom forming a first virtual image of the illuminated graticule;
   (d) the apparatus being arranged to have the etched surface of the crystal to be tested placed in close proximity to and parallel with the opposite side of said one side of the first said mirror, whereby, when the crystal is so placed, the etched surface thereof also reflects the light emanating from the graticule to form a second virtual image of the illuminated graticule superimposed on the first virtual image and substantially in the same place thereof, whereby, the orientation of the crystal may be determined by a visual reading of the centre of the second virtual image with respect to the scale of the first virtual image.

2. An apparatus as defined in claim 1 wherein the means for illuminating the graticule comprises a reflector, a source of high intensity light and a condensing lens aligned in that order along an axis through the centre of the graticule and extending from the graticule on the side thereof remote from the partial reflecting plane mirrors, the reflector being furthest from the graticule; and wherein the graticule is formed with clear lines on an opaque background.

3. An apparatus as defined in claim 1 wherein the means for illuminating the graticule comprises a neutral density filter having an aperture in the centre thereof, a condensing lens and a source of high intensity light, said filter, lens and source of light being aligned in that order along an axis through the centre of the graticule and extending from the graticule on the side thereof remote from the partial reflecting plane mirrors; and including a further lens located between the graticule and said further partial reflecting plane mirror, the light emanating from the graticule being refracted by said further lens and producing therein an enlarged virtual image of the graticule, the enlarged virtual image being reflected to form said first and second virtual images; and wherein the graticule is formed with clear lines on an opaque background.

4. An apparatus for determining the orientation of a single crystal having an etched surface where the approximate crystallographic plane of the crystal is known, comprising:
   (a) a graticule having its lines forming a scale symmetrical about a central spot of the graticule;
   (b) means for illuminating the graticule with its central spot being illuminated to a greater intensity than the remainder of the scale;
   (c) a partial reflecting plane mirror spaced a predetermined distance from the graticule;

(d) means for directing the light emanating from the graticule to be incident on one side of said mirror, the reflection therefrom forming a first virtual image of the illuminated graticule;

(e) the apparatus being arranged to have the etched surface of the crystal to be tested placed in close proximity to and parallel with the opposite side to said one side of said mirror, whereby, when the crystal is so placed, the etched surface thereof also reflects the light emanating from the graticule to form a second virtual image of the illuminated graticule superimposed on the first virtual image and substantially in the same plane thereof, said directing means permitting the simultaneous viewing of said first and second virtual images of the illuminated graticule and its central spot, whereby the orientation of the crystal may be obtained from the visual location of the center of the second virtual image with respect to the scale of the first virtual image.

References Cited in the file of this patent

UNITED STATES PATENTS

| | | |
|---|---|---|
| 2,038,914 | Templeton | Apr. 28, 1936 |
| 2,437,228 | Mears et al. | Mar. 2, 1948 |
| 2,439,836 | Willard | Apr. 20, 1948 |
| 2,954,721 | Voelker | Oct. 4, 1960 |

OTHER REFERENCES

Combes et al.: Mechanical and Thermal Properties of Certain Optical Crystalline Materials, JOSA, vol. 41, No. 4, April 1951, page 216.

Hanscock et al.: Simplified Light Reflection Technique, Review of Scientific Instruments, December 1956, page 1082.

Schwuttke: Routine Crystal Orientation, The Sylvania Technologist, vol. XI, No. 1, January 1958, pages 1–5.